(12) United States Patent
Kim et al.

(10) Patent No.: US 11,060,942 B2
(45) Date of Patent: Jul. 13, 2021

(54) MICRO POWER WATER LEAK DETECTOR

(71) Applicant: Ademco Inc., Golden Valley, MN (US)

(72) Inventors: Hyunki Kim, Rogers, MN (US); Anh Nguyen, Bloomington, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/430,240

(22) Filed: Feb. 10, 2017

(65) Prior Publication Data
US 2018/0231430 A1 Aug. 16, 2018

(51) Int. Cl.
*G01M 3/16* (2006.01)
*F24H 9/20* (2006.01)
*G08B 19/00* (2006.01)
*G01M 3/18* (2006.01)

(52) U.S. Cl.
CPC ............ *G01M 3/16* (2013.01); *F24H 9/2007* (2013.01); *G01M 3/188* (2013.01); *G08B 19/00* (2013.01)

(58) Field of Classification Search
CPC ....... G01M 3/16; G01M 3/188; F24H 9/2007; G08B 19/00
USPC .................. 219/490; 360/522, 604
See application file for complete search history.

(56) References Cited

U.S. PATENT DOCUMENTS

| 3,289,936 | A |  | 12/1966 | Coburn |
| 3,523,175 | A |  | 8/1970 | Gygax |
| 4,211,735 | A |  | 7/1980 | Berlin |
| 4,257,389 | A |  | 3/1981 | Texidor et al. |
| 4,598,273 | A | * | 7/1986 | Bryan, Jr. ............. E04D 13/006 200/61.04 |
| 4,705,936 | A |  | 11/1987 | Fowler |
| 5,008,650 | A | * | 4/1991 | Hoiberg ................ G01F 23/241 200/61.05 |
| 5,334,973 | A | * | 8/1994 | Furr ........................ G01M 3/16 200/61.05 |
| 5,345,224 | A | * | 9/1994 | Brown .................... F24H 9/165 340/605 |
| 5,546,009 | A |  | 8/1996 | Raphael |
| 6,389,881 | B1 |  | 5/2002 | Yang et al. |
| 6,489,895 | B1 |  | 12/2002 | Apelman |
| 6,701,874 | B1 |  | 3/2004 | Schultz et al. |

(Continued)

FOREIGN PATENT DOCUMENTS

JP 2012052168 A 3/2012
JP 2012052700 A 3/2012

OTHER PUBLICATIONS

Light Engineered Displays, Inc., "Aqua Alert Advanced Leak Detection Systems," 2 pages, prior to Jul. 20, 2016.

(Continued)

*Primary Examiner* — Dana Ross
*Assistant Examiner* — Michael S. Poetzinger
(74) *Attorney, Agent, or Firm* — Shumaker & Sieffert, P.A.

(57) ABSTRACT

A fluid sensing system and approach having a leak sensor. The leak sensor may output a signal when a fluid is detected. The signal may go to an alarm circuit which can sound a warning or alert. The signal may also go to a control interface of a piece of equipment, such as a water heater, to shut off the piece equipment in an event that it is causing a leak of fluid. Also, the sensing system may have a low battery sensor and indicator in case a battery supplying power for the sensing system is running low. The sensing system may be made of analog circuitry and discrete components.

16 Claims, 14 Drawing Sheets

(56) References Cited

U.S. PATENT DOCUMENTS

| | | | |
|---|---|---|---|
| 6,832,407 | B2 | 12/2004 | Salem et al. |
| 7,142,123 | B1 | 11/2006 | Kates |
| 7,973,667 | B2 | 7/2011 | Crnkovich et al. |
| 8,031,079 | B2 | 10/2011 | Kates |
| 9,105,175 | B1 * | 8/2015 | Cantolino ............... F24H 9/16 |
| 9,262,909 | B1 | 2/2016 | Grant |
| 9,433,742 | B2 | 9/2016 | Manzke et al. |
| 2001/0023488 | A1 * | 9/2001 | Breunig ............... G06F 1/305 |
| | | | 713/300 |
| 2004/0060346 | A1 | 4/2004 | Bonne et al. |
| 2005/0067049 | A1 | 3/2005 | Fima |
| 2005/0275528 | A1 | 12/2005 | Kates |
| 2006/0044133 | A1 | 3/2006 | Lou |
| 2009/0224927 | A1 | 9/2009 | Sudy et al. |
| 2011/0093220 | A1 | 4/2011 | Yang et al. |
| 2013/0021159 | A1 | 1/2013 | Timm |
| 2013/0037129 | A1 | 2/2013 | Murphy |
| 2015/0000380 | A1 | 1/2015 | Cho et al. |
| 2016/0172570 | A1 | 6/2016 | Wright et al. |

OTHER PUBLICATIONS

George Risk Industries, "WS-20 Home Water Leak Alarm System," 3 pages, Jun. 20, 2008.
Ellis, "Detecting Alarm Sounds," Department of Electrical Engineering, Columbia University, New York, NY, USA, accessed from www.ee.columbia.edu, prior to Sep. 27, 2016, 4 pages.

* cited by examiner

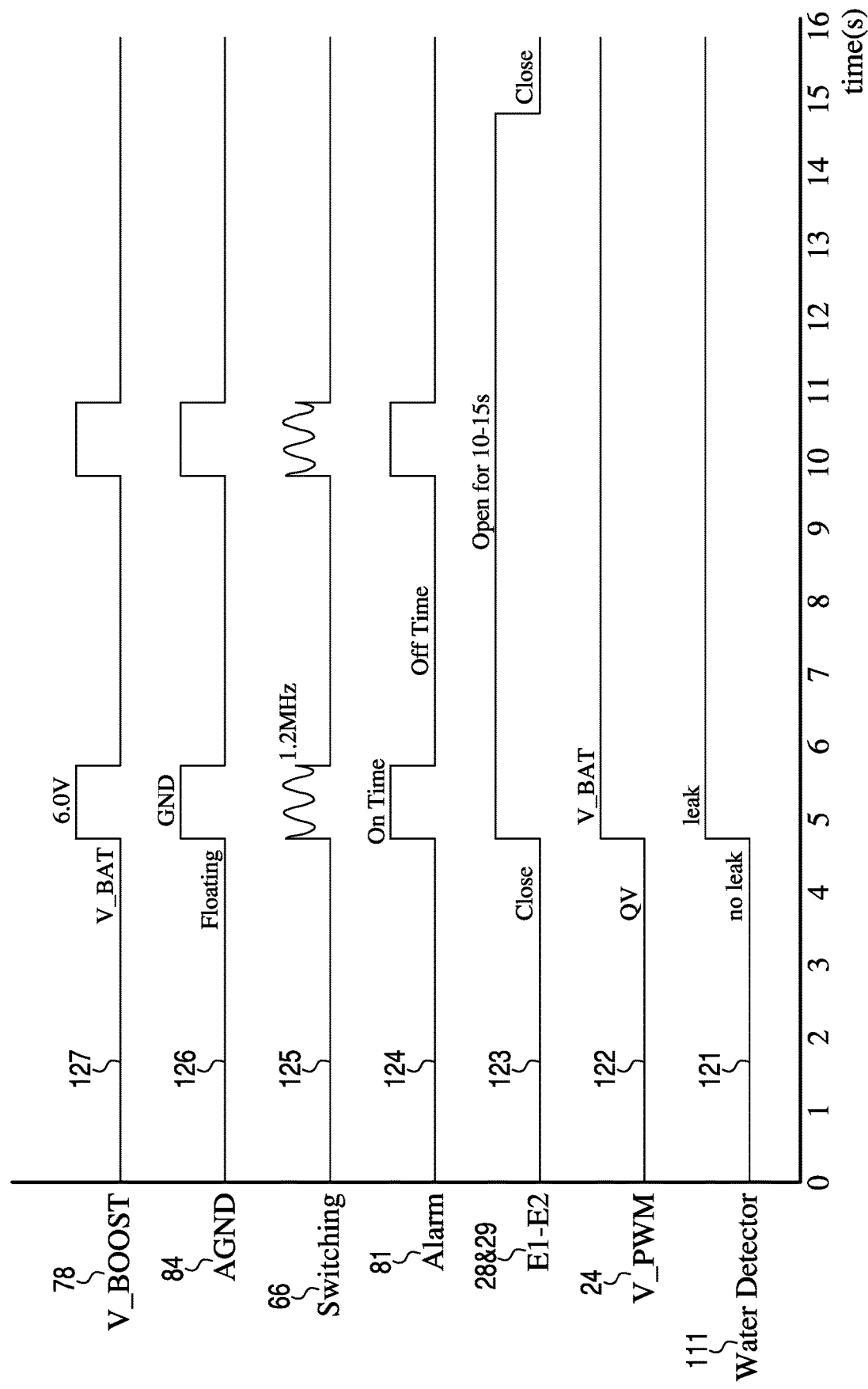

MICRO POWER WATER LEAK DETECTOR

BACKGROUND

The present disclosure pertains to sensors, particularly liquid sensors, and more particularly to sensors with warning devices.

SUMMARY

The disclosure reveals a fluid sensing system and approach having a leak sensor. The leak sensor may output a signal when a fluid is detected. The signal may go to an alarm circuit which can sound a warning or alert. The signal may also go to a control interface of a piece of equipment, such as a water heater, to shut off the piece equipment in an event that it is causing a leak of fluid. Also, the sensing system may have a low battery sensor and indicator in case a battery supplying power for the sensing system is running low. The sensing system may be made of analog circuitry and discrete components.

BRIEF DESCRIPTION OF THE DRAWING

FIG. 11 is a timing diagram of the present system.

DESCRIPTION

Figure 1:
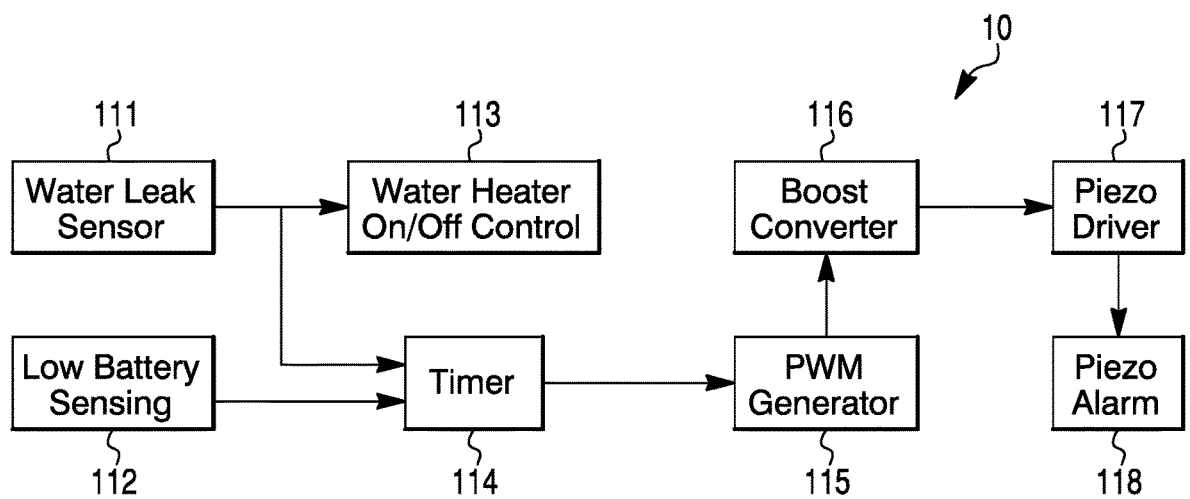
FIG. 1 is a diagram of an example of a present water leak detector system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

There appear to be many alarm devices in the market today. Their primary application appears to detect and warn people when there is a presence of smoke, fire, water leak, and so on. Many of these devices may be battery powered, so one of motivation in this area would tend to design a system that would last for a long time at a low cost. The present device may be used for a water leak alarm system but the device may be also used for any other kind of alarm system. A water leak detector may be designed to detect a water leak from a water heater, alert the customer about the detected leak with sound, and shut off the water heater's gas valve to prevent or minimize property damage caused by a water leak. The water leak detector may detect water with a metal probe. In addition, the customer may use a water sensing cable to extend the sensing area. The device may be battery powered which can work up to ten years without incident in a standby mode. A lower power design may allow the alarm to stay on for a long time when there is a water leak present in case the customer is not at home.

FIG. 1 is a block diagram of an example of a present water leak detector system 10. A water leak sensor 111 and the low battery sensing circuit 112 may be on a standby mode. System 10 may monitor water leaks and battery voltage all the time. Very low current may be consumed until the water leak sensor 111 or low battery sensing block 112 is activated. A water heater on/off control 113 may be used to turn on a relay or enable another safety feature. A boost converter 116 may provide a power boost to drive a piezo driver circuit 117. Piezo driver circuit 117 may drive a piezo 118 to create a loud sound. A timer 114 and a PWM generator 115 may cycle turn on and off boost converter 116 and piezo driver circuit 117.

Figure 2:
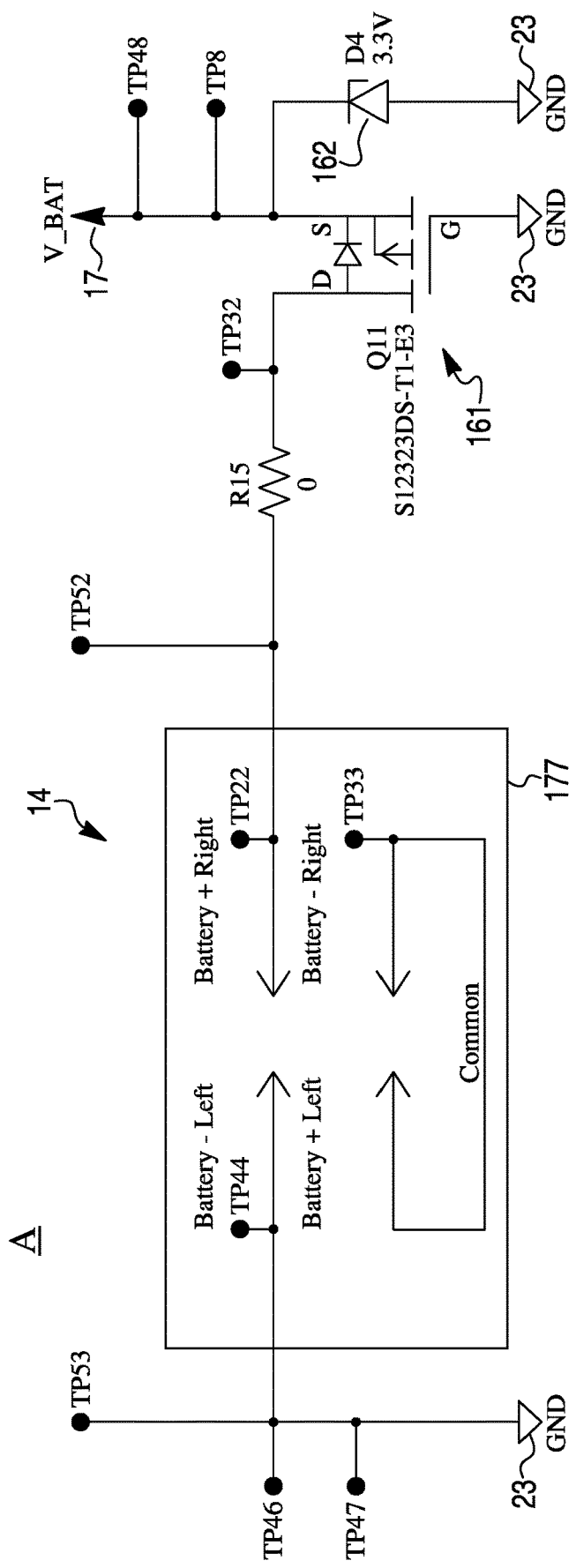
FIG. 2 is a diagram that shows a battery pack.
Figure 3:
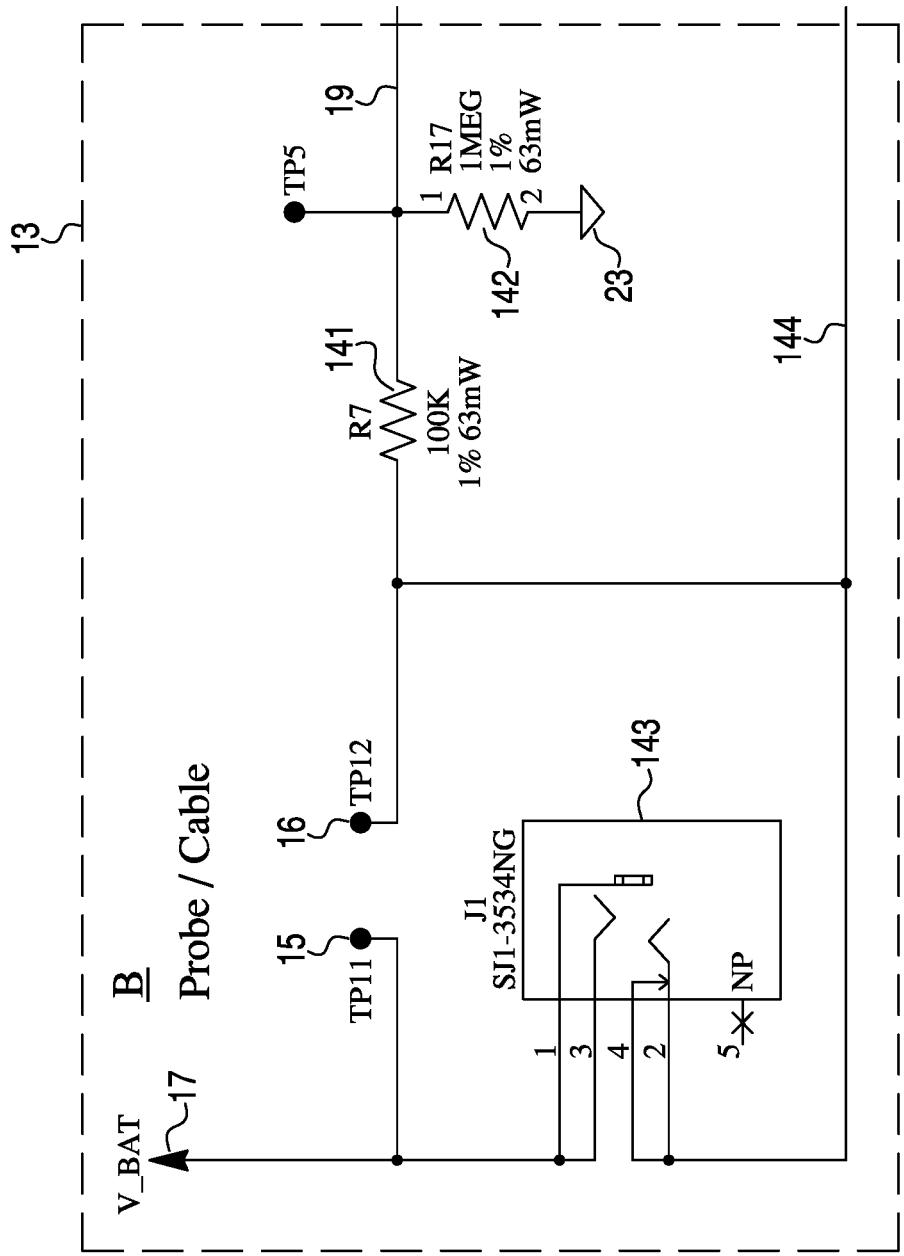
FIG. 3 and FIG. 4 are diagrams that reveal a water sensing circuit.
Figure 4:
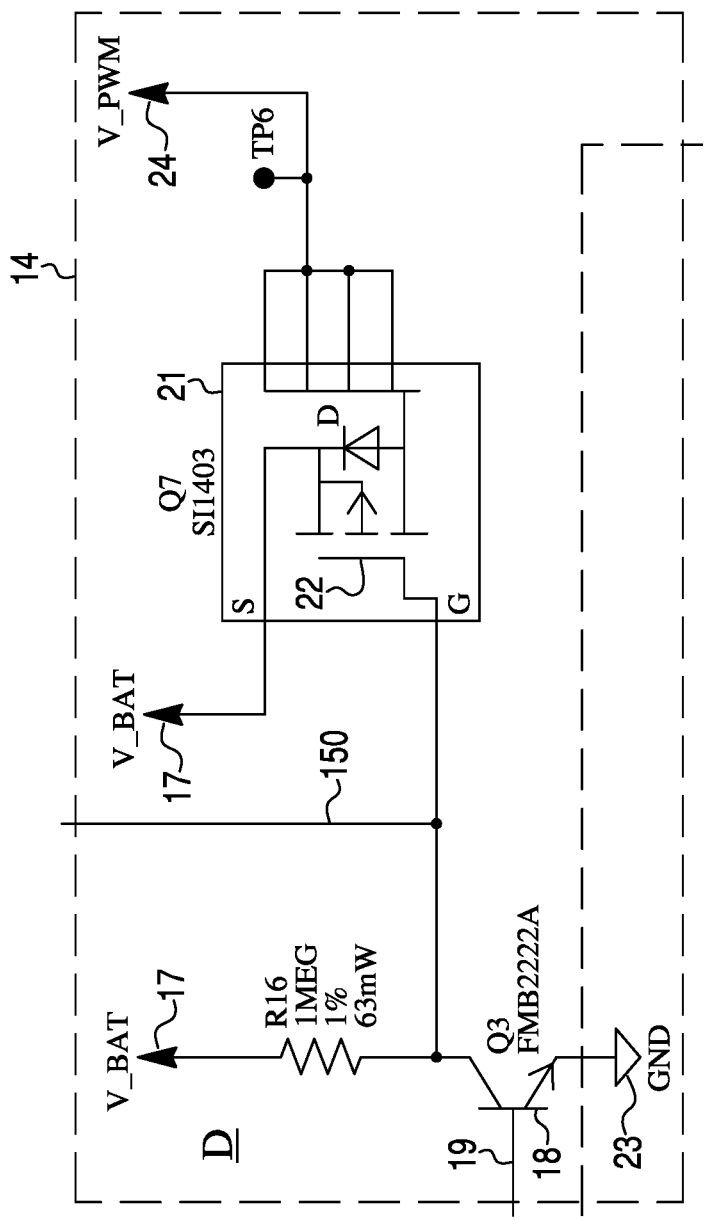

Components of water leak sensor 111 may be noted. Block 14 (A) in the FIG. 2 schematic shows two double-A batteries in series, and may provide V_BAT 17 from 2V-3.3V to drive system 10 through a P channel MOSFET 161 (Q11), which will protect a battery 177 from drain when battery 177 is installed in reverse direction. Diode 162 (D4) may be a 3.3V TVS and can be used to protect circuits from electrostatic discharge (ESD). Block 13 (B) of FIG. 3 and block 14 (D) of FIG. 4 may be the water sensing circuit. When water is present, an impedance may appear between point 15 (TP11) and point 16 (TP12), and may allow V_BAT 17 from block 13 (B) to turn on transistor 18 (Q3) in block 14 (D). Transistor 18 (Q3) may be an NPN transistor that may turn on when there is 0.6 V applied to its base via line 19. A one micro-fared capacitor and a 3.3V TVS diode (not shown) may be connected between line 19 and ground 23. When there is no water, transistor 18 (Q3) may be in the off state and the voltage applied to a gate 22 of a transistor 21 (Q7) may be equal to V_BAT 17. When there is water present, transistor 18 (Q3) may turn on and pull gate 22 of transistor 21 (Q7) towards a ground 23 and turn it on. When transistor 21 (Q7) turns on, V_PWM 24 may connect to V_BAT 17 and provide power to a timer and a pulse width modulation (PWM) generator.

Figure 5:
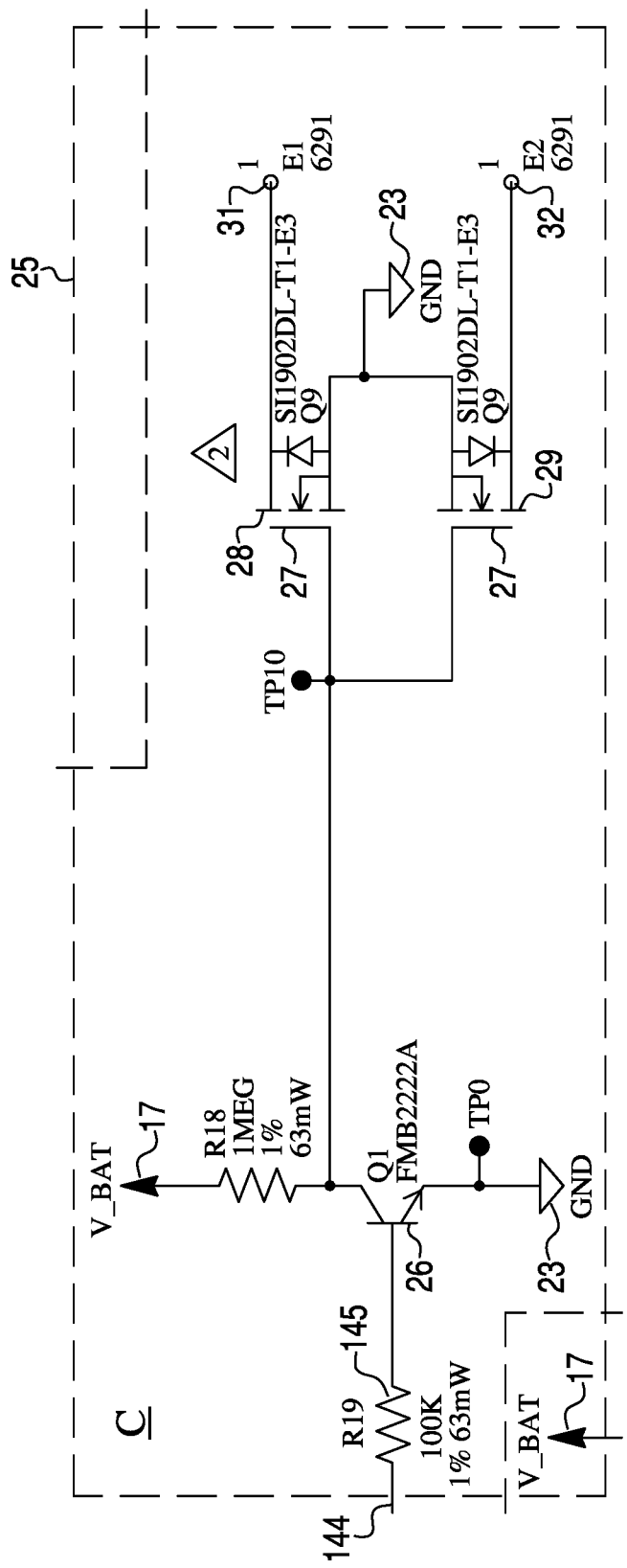
FIG. 5 is a diagram of a safety feature that may be used in the water leak detector.

Water heater on/off control 113 may be noted. A block 25 of FIG. 5 (C) shows a safety feature that may be used in the water leak detector. When there is no water present, a transistor 26 (Q1) may be in the off state and a voltage may appear at gates 27 of transistors 28 and 29 (Q9) that is equal to V_BAT 17. When there is water present, transistor 26 (Q1) may be on and pull gates 27 of transistors 28 and 29 (Q9) to a ground level 23. Transistors 28 and 29 (Q9) may be of a bidirectional N-channel MOSFET chip such that it turns on when a voltage difference between a gate and source appears greater than its threshold voltage. The body diodes, within the MOSFET may prevent current flow from terminal 31 (E1) to terminal 32 (E2), and vice versa when transistors 28 and 29 (Q9) are in the off state. Terminal 31 (E1) and terminal 32 (E2) may be connected to a thermopile. When there is no water, the thermopile may provide power to the water heater control board and turn on a gas valve.

When water is present, transistors 28 and 29 (Q9) may turn off, the gas valve may disconnect and the fire in the water heater may turn off.

Figure 5A:
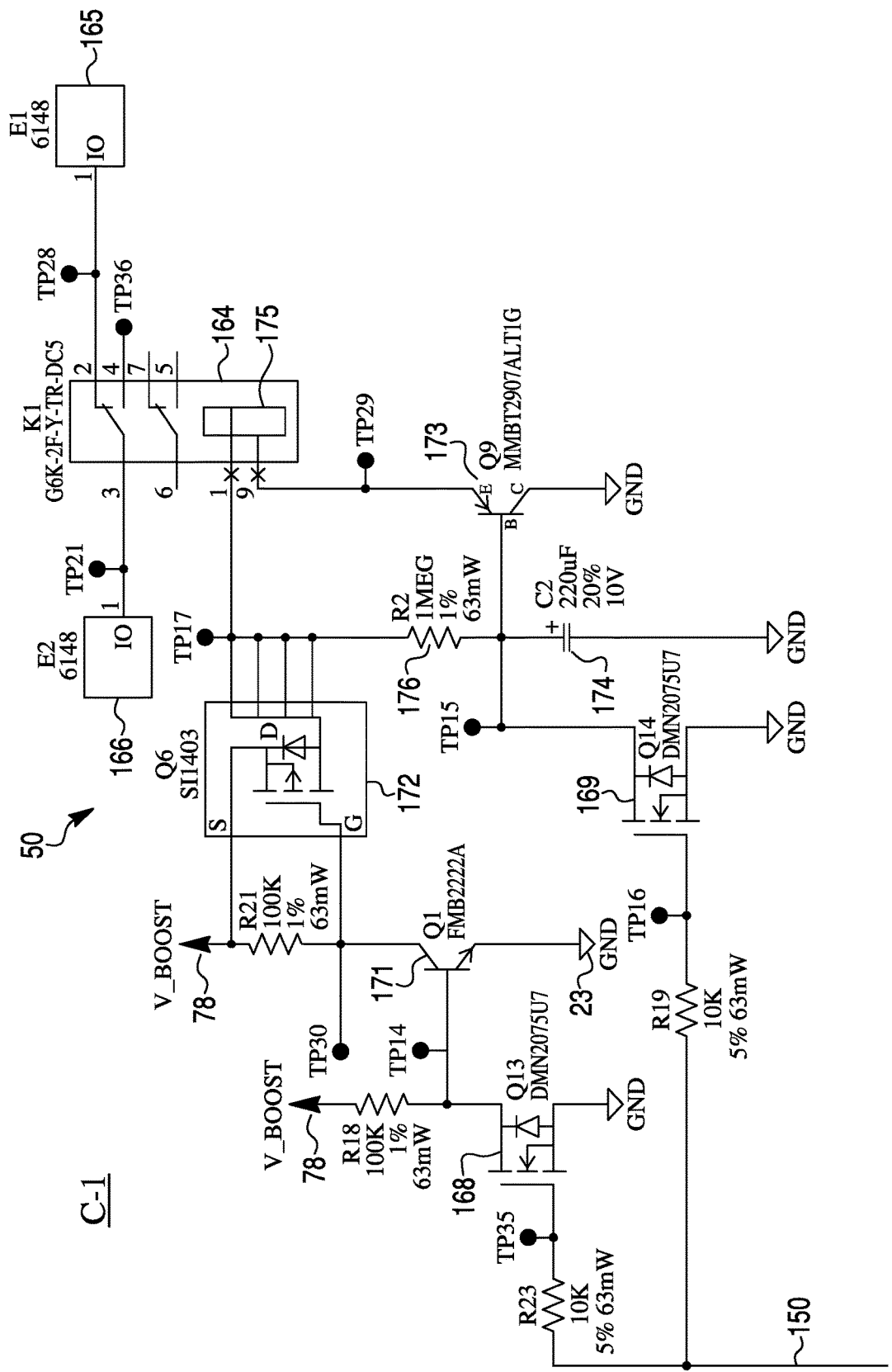
FIG. 5a is a diagram of an alternative safety feature.

In another approach circuit 50 (block C-1) of FIG. 5a, a 5V non-latched relay 164 could be used to control the switch between component 165 (E1) and component 166 (E2). In standby mode, component 165 (E1) and component 166 (E2) may be connected to each other, allowing power to flow between a thermopile and water heater through pin 2 and pin 3 of relay 164 (K1). When there is a water leak, transistor 168 (Q13) and transistor 169 (Q14) turn off and transistor 171 (Q1), 172 (Q6), and 173 (Q9) turn on. During the same time a capacitor 174 (C2) is being charged by V_BOOST 78 at 6V, a relay coil 175 is being energized through transistor 173 (Q9). Terminals 165 and 166 are disconnected during the energizing of relay coil 175 until capacitor 174 (C2) voltage reaches 6V. When capacitor 174 (C2) voltage reaches 6V, transistor 173 (Q9) turns off and no current flows to relay coil 175. Terminals 165 and 166 reverse back to a previous position, which is a normally closed contact. This process may take about 10 to 15 seconds. When there is no water, transistor 168 (Q13) and transistor 169 (Q14) turn on and V_BOOST 78 is blocked because transistor 172 (Q6) and transistor 171 (Q1) are off. Capacitor 174 (C2) may be fully discharged to GND 23 but relay 164 will remain in a normally closed contact. This design may also ensure that terminals 165 and 166 stay connected in order to keep the water heater in an operational mode even if battery 177 is dead. This feature is different from a previous MOSFET design. A line 150 in circuit 50 (block C-1) of FIG. 5a may be connected to a collector of NPN transistor 18 in FIG. 4.

Low battery sensor 112 may be designed to monitor a 3V battery voltage all of the time with a very low power (e.g., micro power) consumption. In block 33 (E) of FIG. 6, a PNP transistor 34 (Q5) may turn on and off by a voltage drop across a resistor 35 (R27), which may be determined by the amount of current flowing to a cathode of a shunt regulator 36 (U4). A low battery threshold voltage may be set to a different value with a change in resistance of resistor 35 (R27). When transistor 34 (Q5) turns on, the current flow in it may be a very small so it cannot control transistor 36 (Q4). With capacitor 37 (C11) on the transistor 34 (Q5) collector, more energy may be stored in capacitor 37 (C11) and it may control transistor 36 (Q4) without failure. When V_BAT 17 drops to the threshold voltage, which is set to be 2.2V in this case, transistor 34 (Q5) may turn off, transistor 38 (Q8) may turn on and connect V_BAT 17 to V_PWM 24. Transistor 34 (Q5) may be made independent from the cathode current of shunt regulator 36 (U4) by a diode 41 (D5) and a diode 42 (D6). Therefore, transistor 34 (Q5) may turn on/off only by an amount of voltage drop across resistor 35 (R27). A 35 uA cathode current of shunt regulator 36 (U4) may be selected to operate properly in this application. In another approach shown by a circuit 60 (block E-1) of FIG. 6a, the current sensor IC 179, such as TPS3710, may replace shunt regulator 36 (U4), diode 41 (D5), diode 42 (D6), transistor 30 (Q4), and transistor 34 (Q5) for cost savings.

Figure 7:
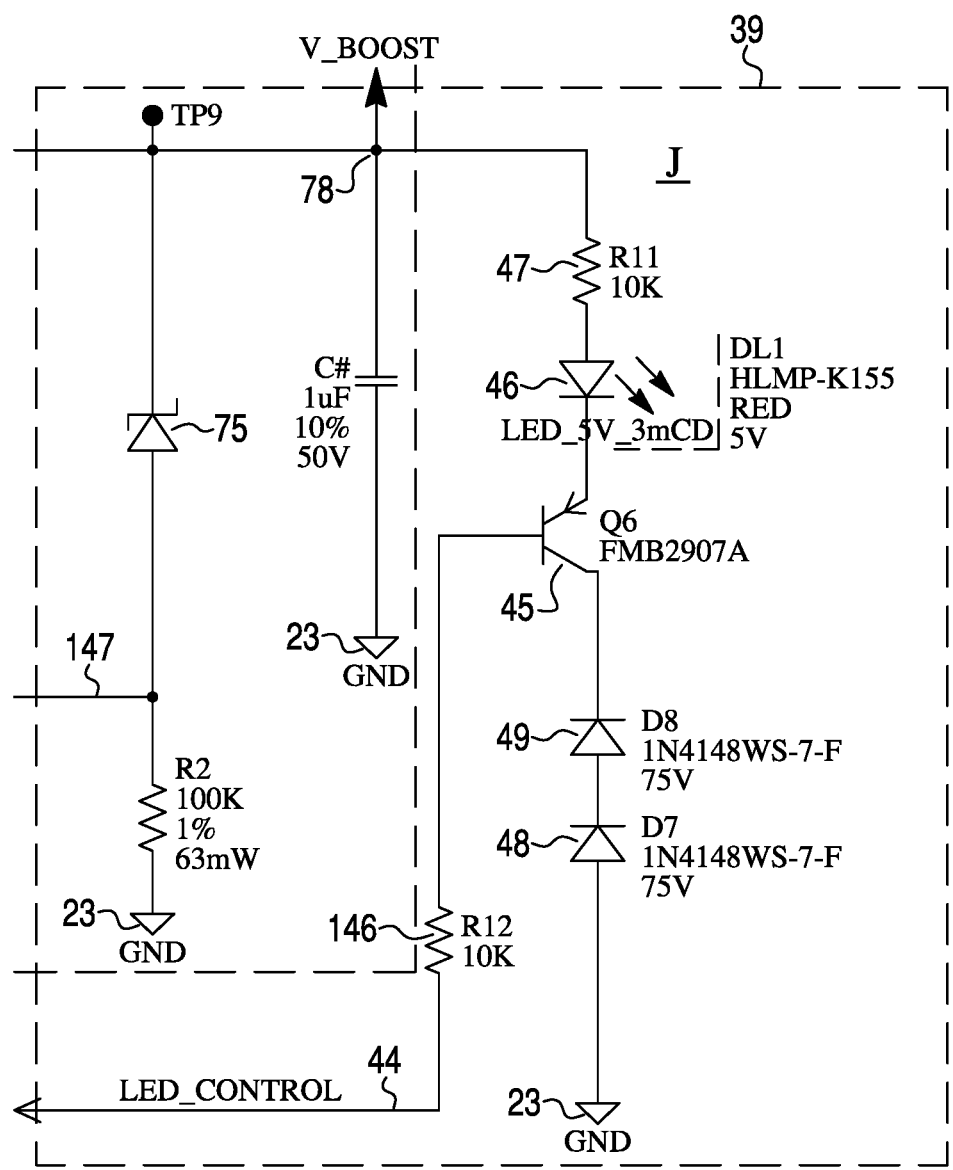
FIG. 7 is a diagram of a low battery warning indicator.

A low battery warning LED 46 may be included in block 39 (J) of FIG. 7. When a LED_CONTROL signal on line 44 changes to low by a low battery sensing circuit, transistor 45 (Q6) may turn on and LED 46 (DL1) may turn on. A resistor 47 (R11) may be used to limit the current going through LED 46 (DL1). In order to prevent transistor 45 (Q6) from turning on may result in LED 46 from going dim while the LED_CONTROL signal on line 44 stays low; a diode 48 (D7) and a diode 49 (D8) may be used to increase transistor 45 (Q6) base threshold voltage by its voltage drop and to float the LED voltage from ground 23.

Figure 7A:
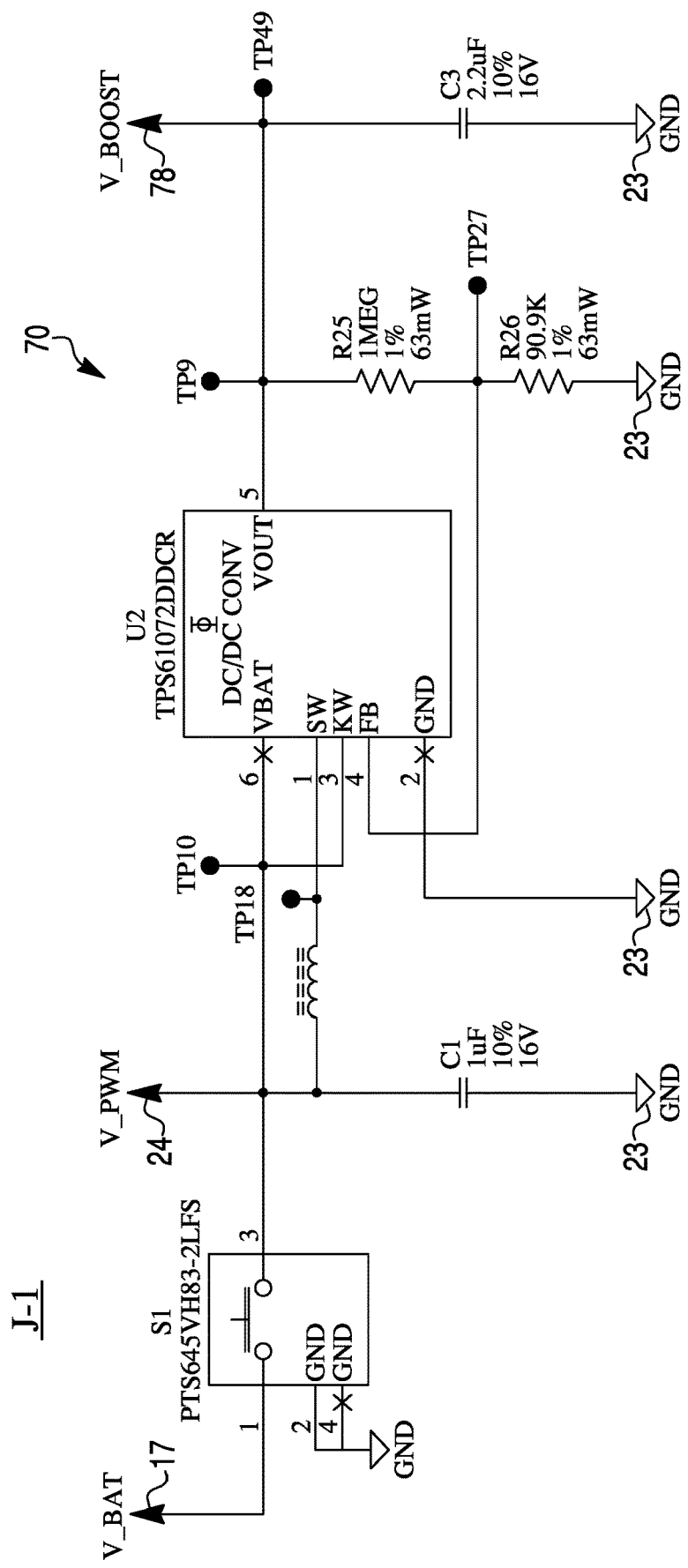
FIG. 7a is a diagram of a boost converter circuit.

FIG. 7a is a diagram of a circuit 70 (block J-1) that may be an example of boost converter 116.

A timer 114 may be noted. A block 51 (F) of FIG. 8 may be an inverting voltage level detector circuit with hysteresis. It may turn PWM and a buzzer on/off repeatedly in intervals determined by a 1.5V reference voltage, hysteresis resistors, and a charging circuit. The upper and lower threshold voltages may be selected to be 1.6V and 1.3V, respectively. Hysteresis voltage may be 0.3V and determined by a resistor 52 (R6) from 10K*(3/0.3). When 3V is applied to V_PWM 24, external timing capacitors, capacitor 53 (C4) and capacitor 54 (C10), may be charged up to ⅔*VCC through a resistor 55 (R13) and resistor 56 (R14), respectively. During charging, the output and charging voltage may be electrically isolated and independent by a diode 57 (D3). The output may stay high for 4 seconds during the time interval that capacitors 53 and 54 (C4 and C10) charge from ⅓*VCC to ⅔*VCC and it may be low for 1 second during the time interval that capacitors 53 and 54 (C4 and C10) discharge from 1.6V to 1.3V through diode 57 (D3). Block 51 (F) may be powered by V_PWM 24 so it is in the off state when there is no water in order to save battery power. Resistor 181 (R11), resistor 182 (R12), transistor 183 (Q3), and transistor 184 (Q12) may be used to extend the alarm off time in order to save battery power when the device is working in low a battery mode. Transistor 185 (Q2), resistor 186 (R22), resistor 187 (R3) and transistor 188 may be used to operate piezo driver 117 with low power consumption. AGND 84 and GND 23 in piezo driver 117 may be connected together, and an alarm sound can occur whenever a low signal appears at an output 189 (pin 7) of amp 151 (U3).

Figure 9:
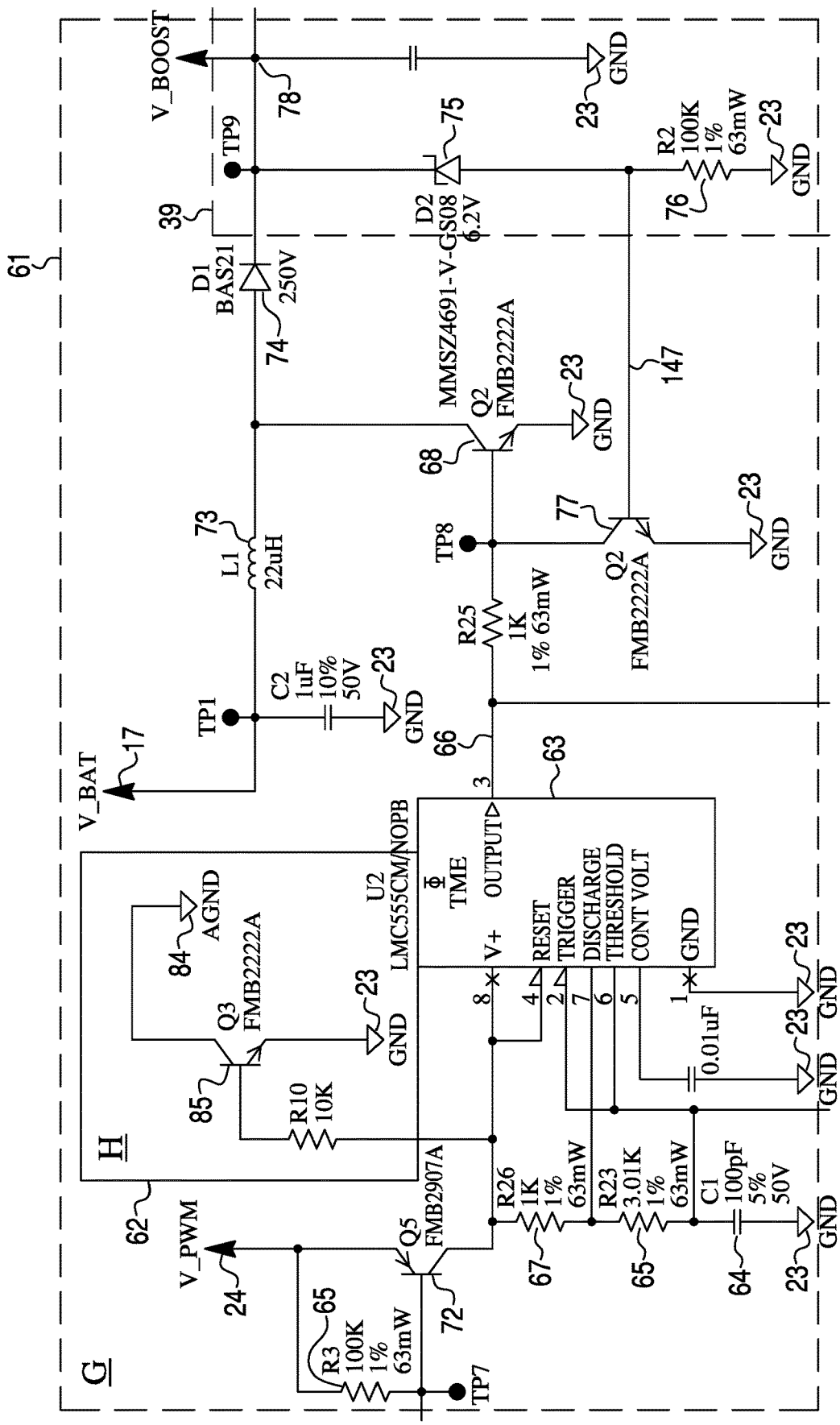
FIG. 9 is a diagram of a pulse width generation circuit that uses a timer.

FIG. 9 is a diagram of a block 61 (G) that incorporates a block 62 (H) that may have PWM generation circuit 115 that uses a timer 63 (IC 555). When a capacitor 64 (C1) discharges through a resistor 65 (R23), an output terminal 66 (pin 3) may go low, and when capacitor 64 (C1) charges through resistor 65 (R23) and a resistor 67 (R26), output terminal 66 (pin 3) may go high. The sequence may repeat and turn on/off a transistor 68 (Q2). A high interval time may be given by 0.695*(R23+R26)*C1 and a low interval time may be given by 0.695*R23*C1.

Figure 10:
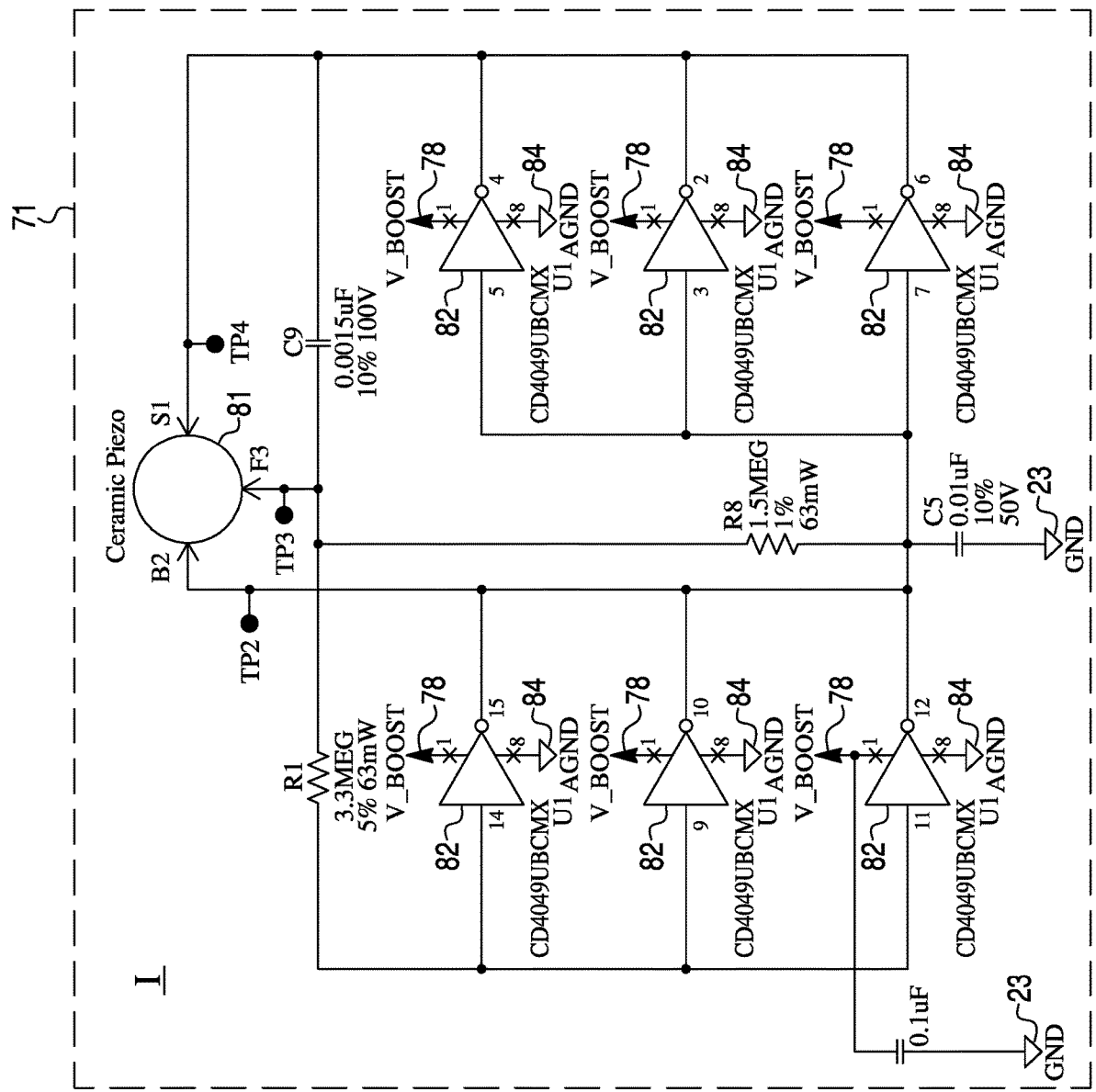
FIG. 10 is a diagram of an example piezo driver and alarm.

Boost converter 116 may convert V-BAT 17 up to 6.0V boost voltage 78. This voltage may be used to drive LED 46 and a piezo driver circuit in block 71 (I) of FIG. 10. NPN transistor 68 (Q2) may be used as a switch in the boost converter. A switching frequency of 1.2 MHz may be generated by the 555 timer IC 63 in block 61 (G). A transistor 72 (Q5) may be a switch that cuts the power from V_PWM 24 to timer IC 63 during a buzzer's off time. Timer IC 63 may be also in the off mode when there is no water present because V_PWM 24 would be zero. Energy may be stored in an inductor 73 (L1), when the switching transistor turns on, and discharged to an output 11 off. This process may be repeated to boost the battery voltage. A Zener diode 75 (D2) may be used as a 6.0 reference voltage and a resistor 76 (R2) may be used to limit the current going to diode 75 (D2). Whenever the output voltage is greater than 6.0V, another NPN transistor 77 (Q2) may turn on and control a duty cycle of main switching transistor 68 and it may maintain the output voltage below 6.0V under any load conditions.

Piezo driver circuit 117 may be used to drive an alarm 118 such as a piezo 81. Circuits 117 and 118 as one instance among others for a driver and alarm may be shown in block 71 of FIG. 10. A three-terminal type of piezo 81 may be used to generate sound. It may work at 6.0 VDC and generate sound using CMOS inverters 82, such as CD4069 and CD4049. The oscillation frequency of about 3.2 KHz and 40 V peak to peak sine wave may be applied to the transducer. An alarm ground (AGND) 84 plane of this driver circuit may be isolated from the main ground (GND) 23 plane. An NPN transistor 85 (Q3) in block 62 (H) may turn on and connect two ground planes 23 and 84 when the sound is on and turn off when the sound is off. Transistor 85 (Q3) may ensure that there is no current flow from V BAT 17 to the piezo driver circuit when the sound is off. Transistor 85 may perform the same function of transistor 188 in FIG. 8.

FIG. 11 is a timing diagram of items in terms of amplitude versus time for the water leak detector system. Trace 121 is an indication of a leak or no leak detected by water detector 111. Trace 122 shows V_PWM 24 at zero volts when there is no indication of a leak by water detector 111 and at V BAT volts where there is an indication of a leak. Trace 123 notes terminals 165 and 166 (K1 in FIG. 5*a*) to be closed during a no leak indication and open, for about 10 to 15 seconds, during a leak indication of detector 111. Trace 124 shows when the alarm turns on at the beginning of the leak indication and alternates being on and off during the leak indication. Trace 125 reveals a switching on and off of a 1.2 MHz signal 66 from a timer chip 63 that follows a pattern of trace 124. Trace 126 is of a potential of an alarm ground 84 which floats during a no leak indication and the is connected to main ground 23 by transistor 85 (Q3) upon the indication of a leak by detector 111. However, alarm ground 84 may be disconnected and connected during the leak indication in synch with trace 125. Trace 127 notes voltage of V_BOOST 78 to be at the V_BAT 17 potential until a leak indication when it goes to about 6.0 volts for a duration that alarm ground 84 is connected to main ground 23 as indication by trace 126. Then trace 127 may show V_BOOST 78 to return to V_BAT 17 when trace 126 shows alarm ground 84 to be floating again in a synchronous fashion alternatively and so on during the leak indication. The order of traces 121 through 127 does not necessarily mean that a causal relationship exists in that order.

FIGS. 2-10 reveal portions of a schematic of the present system 10. These drawings represent one illustrative example of system 10. There may be other drawings that represent system 10. The following information may indicate common conductive connections and lines among the portions. Base 19 of transistor 18 of FIG. 4 may be connected to one end of resistors 141 (R7) and 142 (R17) of FIG. 3. The other end of resistor 141 may be connected to point 16, jack 143 and line 144. The other end of resistor 142 may be connected to ground 23. Line 144 may be connected to one end of resistor 145 (R19) in FIG. 5. The other end of resistor 145 may be connected to a base of transistor 26.

Figure 6:
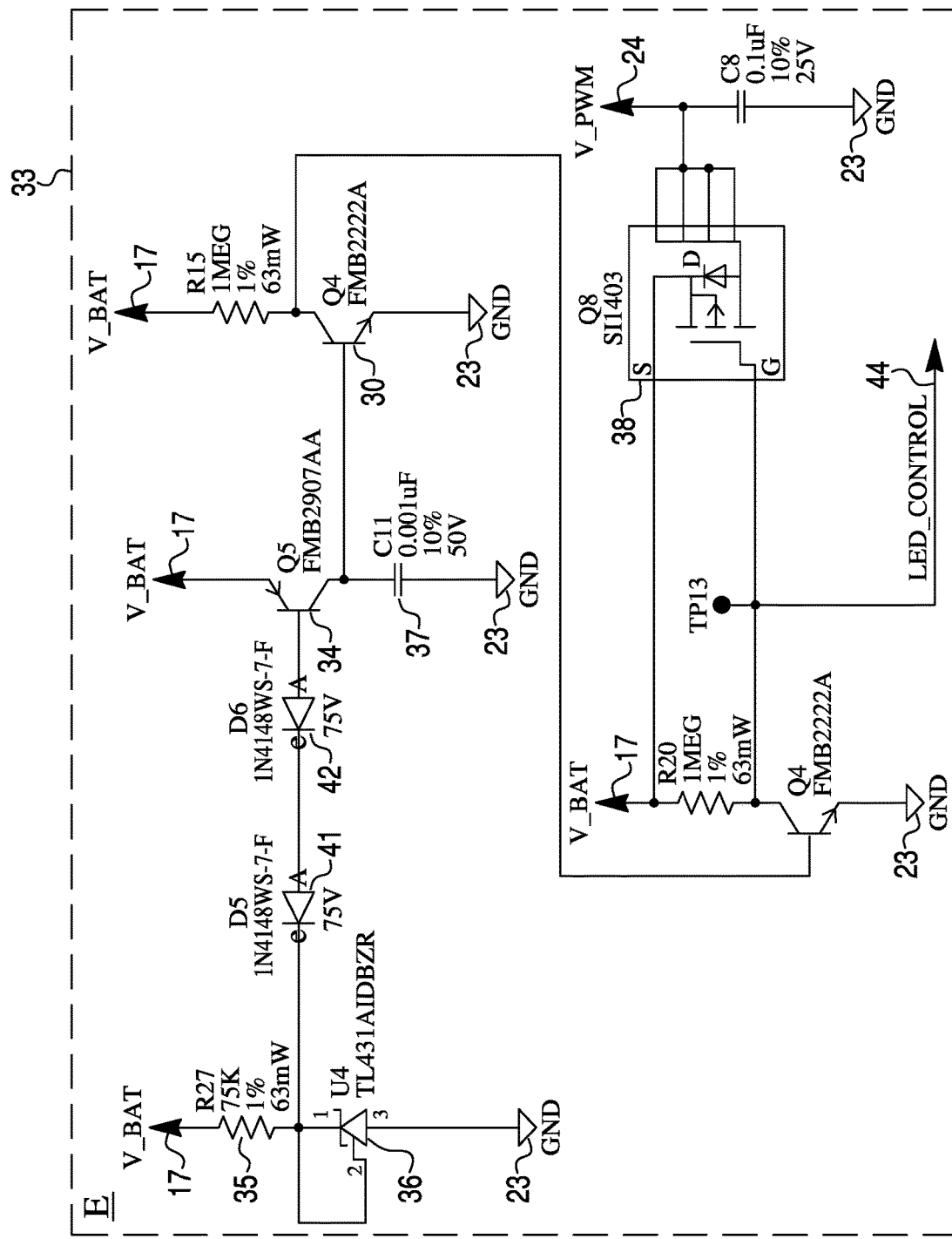
FIG. 6 is a diagram of a low battery sensor.
Figure 6A:
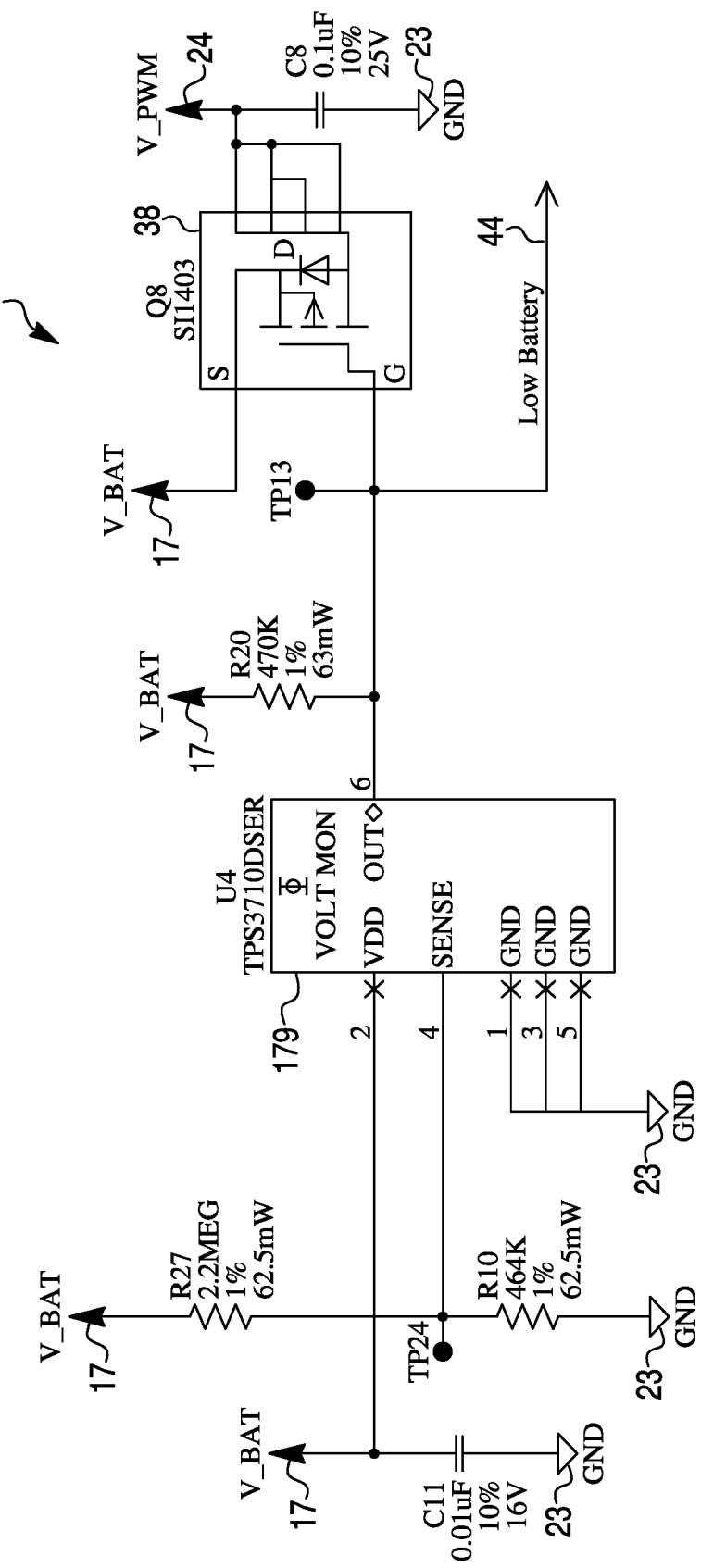
FIG. 6a is a diagram of another low battery sensor.

Line 44 of FIG. 6 may go to one end of a resistor 146 (R12) of FIG. 7. The other end of resistor 146 may go to a base of transistor 45. A line 147 may go from an anode of Zener diode 75 (block 39) in FIG. 7 to a base of transistor 77 (block 61) of FIG. 9.

Figure 8:
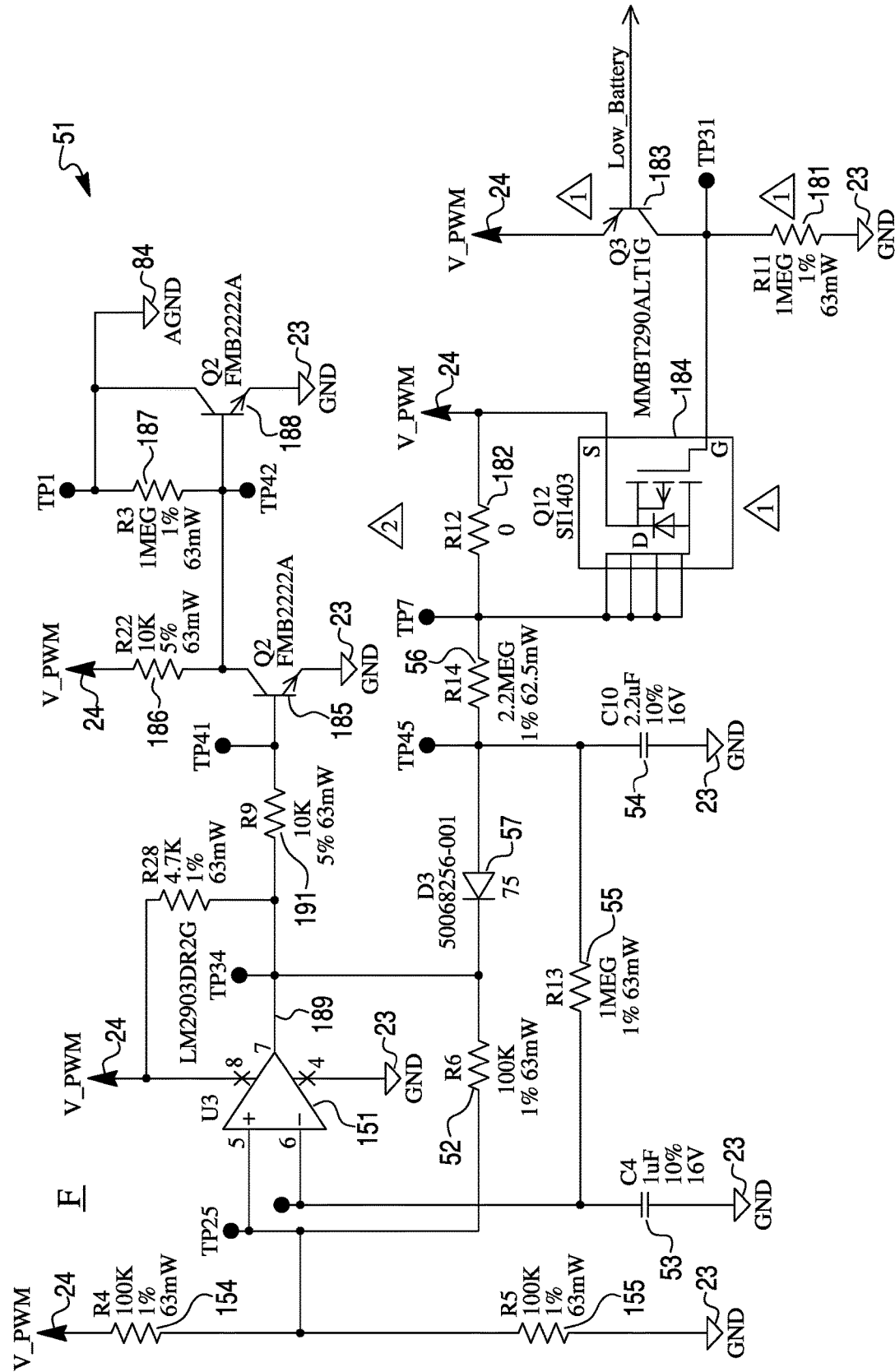
FIG. 8 is a diagram of an inverting voltage level detector circuit with hysteresis.

Block 51 of FIG. 8 may have an amp 151 with an inverting input connected to one end of resistor 55 and one end of capacitor 53. A non-inverting input may be connected to one end of resistor 52, one end of a resistor 154 (R4) and one end of resistor 155. The other ends of resistors 154 and 155 may be connected to V_PWM 24 and GND 23, respectively. Output 189 of amp 151 may go to one end of a resistor 191 (R9), the other end of resistor 52 and a cathode of diode 57. The other end of resistor 191 may be connected to a base of transistor 185.

To recap, a water sensing system may incorporate a water heater control module connected to a water heater, a water leak detector connected to the water heater control module, a battery pack, a battery voltage sensor connected to the battery pack, a boost module connected to the water leak detector and the battery voltage sensor, an alarm module connected to the boost module, and a low battery indicator connected to the battery voltage sensor. The water leak detector may use electrical conductivity through water for water detection. The water leak detector may continuously detect water in real time.

The boost module may incorporate a timer connected to the water leak detector, a signal generator connected to the timer, and a voltage converter connected to the timer.

The alarm module may incorporate an alarm driver connected to the voltage converter, and an alarm connected to the alarm driver.

The water leak detector, the water heater control module, the battery voltage sensor, the boost module, and the alarm module may be analog circuits.

The water leak detector may incorporate a sensing cable to cover an area sensed for water.

When the water leak detector senses water, one or more actions that occur may be from a group incorporating a signal from the water leak detector that goes to the water heater control module to shut down the water heater in the area sensed for water, and a signal from the water leak detector that goes to the alarm module to sound an alarm indicating that water has been sensed by the water leak detector.

When the battery voltage sensor indicates a voltage that is less than a predetermined voltage, then the battery voltage sensor may send a signal to the low battery indicator that reveals a voltage condition of the battery pack.

The water leak detector may have a capability to sense water and provide a signal to the water heater control module to shut down the water heater, and provide a signal to the alarm module to sound the alarm. The capability may have a duration of ten years or more on a set of initially fresh batteries in the battery pack, or a duration until water is sensed by the water leak detector, whichever duration is shorter.

A fluid leak detector may incorporate a liquid leak sensor, a liquid heater control module connected to the liquid leak sensor, a timer connected to the liquid leak sensor, and an alarm module connected to the timer.

The alarm module may incorporate a signal generator connected to the timer, a voltage boost converter connected to the signal generator, and an alarm circuit connected to the voltage boost converter.

The alarm circuit may incorporate a piezo driver connected to the voltage boost converter, and a piezo alarm connected to the piezo driver.

The detector may further incorporate a battery power module connected to the liquid leak sensor, the liquid heater control module, the timer, the signal generator, the voltage boost converter and the alarm circuit.

The liquid leak sensor may have two conductive points that, upon being connected via a liquid, have a change of impedance between the two conductive points so as to cause a first transistor circuit to provide a liquid conduction signal to the liquid heater control module and the timer.

The signal generator may provide a pulse width modulated (PWM) signal to the voltage boost converter.

The liquid conduction signal to the liquid heater control module may shut off a liquid heater. The liquid conduction signal to the timer may result in the signal generator outputting the PWM signal used to convert a first voltage from the battery power module to a second voltage via the voltage boost converter.

The second voltage from the voltage boost converter may go to a piezo driver. A piezo alarm may be energized by the piezo driver.

In an event of the battery power module having the first voltage below a predetermined voltage, a low battery sensing circuit may cause a second transistor circuit to connect the second voltage from the voltage boost converter to a low battery voltage indicator.

An approach for detecting leaks from a water heater, may incorporate connecting a water leak sensor to a water heater control module and a timer, detecting whether there is water leakage from or around a water heater, and powering the water leak sensor, the water heater control module, and the timer with a first voltage from a battery set. If there is water leakage detected from the water heater, then the water heater control module may shut off the water heater and the timer may be started. The timer may start a pulse width modulated (PWM) signal generator. The PWM signal generator may drive a boost converter that converts the first voltage to a second voltage. The second voltage may drive an alarm circuit.

The alarm circuit may be connected to the water leak sensor. The alarm circuit may sound when there is water leakage detected by the water leak sensor from or around the water heater.

The approach may further incorporate connecting a low battery sensing device to the timer. If a low battery condition is detected by the low battery sensing device, in which the first voltage of the battery drops to or below a pre-determined threshold voltage, a low battery warning signal may be provided by the low battery sensing device. An indicator circuit may be provided the low battery warning signal by the low battery sensing device to reveal a low battery warning.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A water sensing system comprising:
   a water heater control circuit connected to a water heater;
   a water leak detector connected to the water heater control circuit, wherein the water leak detector comprises:
      a first switching element comprising a first gate terminal and a first set of load terminals, wherein a first load terminal of the first set of load terminals is electrically connected to a ground, and wherein a second load terminal of the first set of load terminals is electrically connected to a node;
      a second switching element comprising a second gate terminal, wherein the second gate terminal is electrically connected to the node; and
      a third switching element comprising a third gate terminal, wherein the third gate terminal is electrically connected to the node,
   wherein the first gate terminal is configured to receive an electrical signal when the water leak detector detects water, the electrical signal causing the first switching element to operate in an activated state,
   wherein by operating in the activated state, the first switching element is configured to create an electrical connection between the second gate terminal and the ground and create an electrical connection between the third gate terminal and the ground in order to apply a ground voltage to the second gate terminal and the third gate terminal, causing the second switching element and the third switching element to operate in a deactivated state, wherein the ground voltage is lower than a voltage applied to the second gate terminal and the third gate terminal while the first switching element does not operate in the activated state,
   wherein a heat source of the water heater operates in an extinguished state while the second switching element and the third switching element operate in the deactivated state and the heat source operates in an ignited state while the second switching element and the third switching element operate in the activated state;
   a boost circuit connected to the water leak detector;
   an alarm circuit connected to the boost circuit; and
   a power source configured to provide a first voltage to the water leak detector,
   wherein the boost circuit is configured to provide a second voltage to the alarm circuit in response to the second switching element and the third switching element operating in the deactivated state, wherein the second voltage is greater than the first voltage.

2. The system of claim 1, wherein the boost circuit comprises:
   a timer electrically connected to the water leak detector; and
   a signal generator electrically connected to the timer, wherein the timer causes the signal generator to cycle the boost circuit between on and off states.

3. The system of claim 2, wherein the alarm circuit comprises:
   an alarm driver electrically connected to the boost circuit; and
   an alarm electrically connected to the alarm driver.

4. The system of claim 2, wherein the water leak detector, the water heater control circuit, the boost circuit, and the alarm circuit represent analog circuits.

5. The system of claim 1, wherein the water leak detector comprises a sensing cable configured to generate the water detector electrical signal.

6. The system of claim 5, wherein when the water leak detector is configured to output, in response to the second switching element and the third switching element operating in the deactivated state, a signal to the alarm circuit in order to cause the alarm circuit to activate an alarm.

7. The system of claim 1, wherein the system further comprises:
   a battery voltage sensor; and
   a low battery indicator electrically connected to the battery voltage sensor, wherein when the battery voltage sensor indicates a voltage that is less than a predetermined voltage, then the battery voltage sensor is configured to:

output a battery voltage signal to the low battery indicator, wherein the battery voltage signal indicates a voltage condition of the power source.

8. The system of claim 1, wherein the boost circuit comprises:
an inductor configured to store energy; and
a switching transistor configured to cause the inductor to discharge the stored energy to the alarm circuit when the second switching element and the third switching element operate in the deactivated state.

9. A method comprising:
receiving, by a first gate terminal of a first switching element, an electrical signal when the water leak detector detects water, the electrical signal causing the first switching element to operate in an activated state, wherein the water leak detector is connected to a water heater control circuit, and wherein the water leak detector comprises:
the first switching element comprising the first gate terminal and a first set of load terminals, wherein a first load terminal of the first set of load terminals is electrically connected to a ground, and wherein a second load terminal of the first set of load terminals is electrically connected to a node;
a second switching element comprising a second gate terminal, wherein the second gate terminal is electrically connected to the node; and
a third switching element comprising a third gate terminal, wherein the third gate terminal is electrically connected to the node;
creating, by the first switching element operating in the activated state, an electrical connection between the second gate terminal and the ground and an electrical connection between the third gate terminal and the ground in order to apply a ground voltage to the second gate terminal and the third gate terminal, causing the second switching element and the third switching element to operate in a deactivated state, wherein the ground voltage is lower than a voltage applied to the second gate terminal and the third gate terminal while the first switching element does not operate in the activated state;
operating, by a heat source of the water heater, in an extinguished state while the second switching element and the third switching element operate in the deactivated state and the heat source operates in an ignited state while the second switching element and the third switching element operate in the activated state,
wherein a boost circuit is connected to the water leak detector, and
wherein an alarm circuit is connected to the boost circuit;
providing, by a power source, a first voltage to the water leak detector; and
providing, by the boost circuit, a second voltage to the alarm circuit in response to the second switching element and the third switching element operating in the deactivated state, wherein the second voltage is greater than the first voltage.

10. The method of claim 9, wherein the boost circuit comprises:
a timer electrically connected to the water leak detector; and
a signal generator electrically connected to the timer, wherein the timer causes the signal generator to cycle the boost circuit between on and off states.

11. The method of claim 10, wherein the alarm circuit comprises:
an alarm driver electrically connected to the boost circuit; and
an alarm electrically connected to the alarm driver.

12. The method of claim 10, wherein the water leak detector, the water heater control circuit, the boost circuit, and the alarm circuit represent analog circuits.

13. The method of claim 9, further comprising generating, by a sensing cable of the water leak detector, the electrical signal.

14. The method of claim 13, further comprising outputting, by the water leak detector in response to the second switching element and the third switching element operating in the deactivated state, a signal to the alarm circuit in order to cause the alarm circuit to activate an alarm.

15. The method of claim 9, further comprising outputting, by a battery voltage sensor when the battery voltage sensor indicates a voltage that is less than a predetermined voltage, a battery voltage signal to a low battery indicator, wherein the battery voltage signal indicates a voltage condition of the power source, wherein the low battery indicator is electrically connected to the battery voltage sensor.

16. The method of claim 9, further comprising causing an inductor to discharge stored energy to the alarm circuit when the second switching element and the third switching element operate in the deactivated state.

* * * * *